Nov. 14, 1944. W. L. BENEDICT 2,362,795
HYDROCARBON CONVERSION PROCESS
Filed Dec. 5, 1940
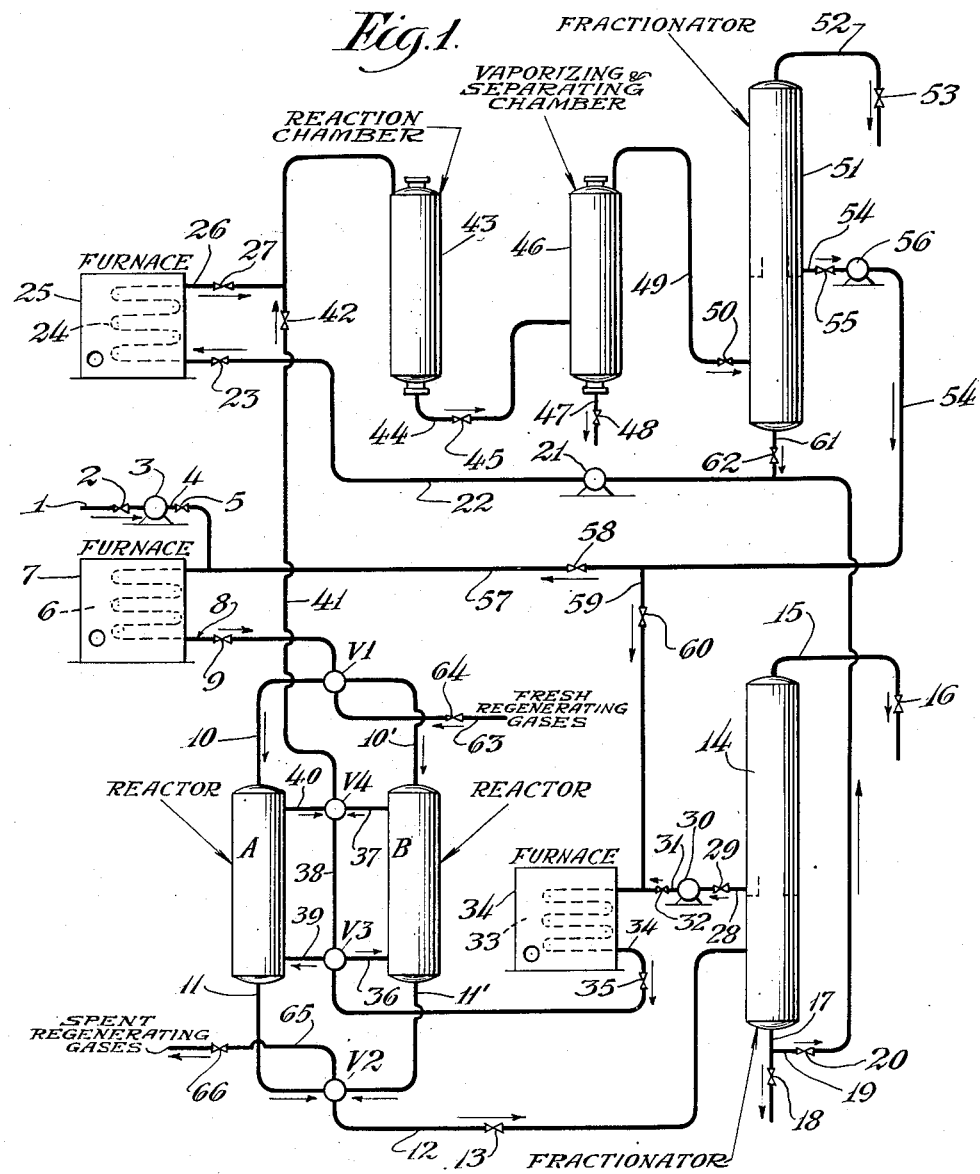
Fig.1.
Fig.2.
Fig.3.
Inventor
Wayne L. Benedict
By Lee J. Gary
Attorney.

Patented Nov. 14, 1944

2,362,795

UNITED STATES PATENT OFFICE 2,362,795

HYDROCARBON CONVERSION PROCESS

Wayne L. Benedict, Chicago, Ill., assignor to Universal Oil Products Company, Chicago, Ill., a corporation of Delaware Application December 5, 1940, Serial No. 368,606

8 Claims. (Cl. 196—52)

This application is a continuation-in-part of my co-pending application Serial No. 309,716, filed December 18, 1939.

This invention relates to an improved method for converting hydrocarbon oils into more valuable hydrocarbons. More specifically, it is concerned with a process which involves both thermal and catalytic cracking treatments wherein intermediate conversion products formed in the treatments are employed as the heat convective medium in supplying heat to the catalytic conversion reaction and in cooling the catalyst undergoing regeneration.

A common practice in the catalytic treatment of hydrocarbons is to employ an extraneous material, such as combustion gases, molten salts, or some other suitable fluid medium, to supply heat to and to conduct heat from the endothermic and exothermic reaction zones, respectively. Generally speaking, however, there are certain disadvantages which accompany an operation employing heat convective media of the type which have found commercial application. On the one hand, the coefficient of heat transfer of the materials and, more specifically, combustion gases is relatively low, and on the other hand material, such as molten salts, in most cases, is, relatively speaking, very corrosive, and therefore the materials mentioned either from the standpoint of heat transfer or corrosion render the operation involving the catalytic treatment of hydrocarbons considerably more expensive than a thermal cracking treatment. Liquids, generally speaking, have a higher coefficient of heat transfer than gases. However, due to the relatively high temperature employed in the catalytic reactions, molten salts are the only liquid materials which have found any great application, largely due to the fact that extremely high temperatures may be encountered before any decomposition takes place. These materials, therefore, would be the most desirable if it were not for excessive corrosion encountered in the equipment.

In order to obviate the disadvantages inherent in a catalytic cracking process employing heating or cooling media of the types referred to above, but at the same time obtain results comparable with or better than those obtained from systems employing such media, my invention provides for utilizing intermediate products formed in the process in conducting heat from the exothermic reaction zone and conveying heat to the endothermic reaction zone.

In the catalytic step of my process two or more reaction zones are employed, the fresh or freshly regenerated catalyst in one or more zones being used for effecting conversion of the hydrocarbons subjected to contact therewith, while the catalyst in the other zone or zones is undergoing regeneration by contacting therewith oxygen-containing gases which are used in burning from the catalyst carbonaceous substances deposited thereon. In order to effect the desired heating and cooling in the respective reactors, I prefer to cool the exothermic reaction zone by contacting therewith the intermediate conversion products from the catalytic and/or thermal treatment at the desired temperature level and thereafter to supply heat to the endothermic reaction zone by contacting therewith the intermediate conversion products leaving the exothermic reaction zone. Intermediate conversion products formed in a cracking treatment are known to be refractory and capable of withstanding extreme temperatures and pressures with relatively low rates of cracking. These materials may be employed successfully, therefore, as the heat convective medium with little danger of extreme excessive coking on the external surfaces of the reaction zone.

In one embodiment the invention comprises maintaining a thermal conversion zone and a catalytic conversion zone, fractionating vaporous reaction products from each conversion zone to separate a desired product from insufficiently converted hydrocarbons, supplying at least a portion of said insufficiently converted hydrocarbons to said catalytic conversion zone, and supplying the remaining portion to said thermal conversion zone after first passing it in indirect heat transfer relationship with the catalyst in said catalytic conversion zone.

In a more specific embodiment the invention comprises maintaining a thermal conversion zone and a catalytic conversion zone, the catalytic conversion zone consisting of at least two catalytic reactors through which streams of hydrocarbon and regenerating gases are alternately directed, at least one of said reactors being used to crack hydrocarbons with a resultant endothermic reaction while simultaneously subjecting the catalyst in other reactors to regeneration by contacting therewith oxygen-containing gas with a resultant exothermic reaction, separately fractionating the reaction products from said thermal and said catalytic conversion zone to separate desired products, intermediate conversion products, and heavy conversion products, passing all or a portion of said intermediate conversion products from the thermal step together with the fresh hydrocarbon oil charged to said catalytic conversion zone, passing the remaining portion of said intermediate conversion products from the thermal step together with said intermediate conversion products from the catalytic step in indirect heat exchange relationship first with the catalyst in said catalytic reactor undergoing regeneration to absorb heat therefrom, and then with the catalyst in said catalytic reactor being used for the conversion of hydrocarbons to supply heat thereto, and thereafter passing the material to said thermal conversion zone together with at least a portion of the aforesaid heavy conversion products from the thermal and catalytic conversion steps.

Fig. 1 in the accompanying drawing illustrates diagrammatically in side elevation one specific form of the apparatus which may be employed embodying the broad features of the invention.

Figs. 2 and 3 are details of the four-way inlet and outlet valves diagrammatically indicated in Fig. 1, Fig. 2 showing a valve in one position, and Fig. 3 showing the passageways therethrough shifted.

Referring now to Fig. 1 of the drawing, charging oil for the process, which may comprise any desired fraction of crude hydrocarbon oil, such as heavy naphtha, kerosene, or gas oil, but preferably one which is substantially vaporized at conditions employed in catalytic cracking, is introduced through line 1 containing valve 2, into pump 3, and line 4 containing valve 5, and commingled with a part of the thermal non-catalytic intermediate conversion products introduced through line 57 formed as hereinafter described. The combined materials are passed through heating coil 6 in which they are vaporized and raised to the desired conversion temperature without substantial pyrolytic cracking being effected, heat being supplied to the oil passing therethrough from furnace 7. The heated vapors from heating coil 6 are conducted through line 8, containing valve 9, to valve V1, after which the vapors are subjected to treatment in the manner to be described more fully later.

In the particular case here illustrated, two reactors, A and B, are employed and each reactor preferably contains a plurality of relatively small diameter tubes containing catalytic material capable of promoting the desired cracking reaction when in a fresh or freshly regenerated state. In addition, each reactor is preferably equipped with a means for introducing a fluid heating or cooling medium around the tubes for the purpose of supplying heat to or withdrawing heat from the reaction zone. It is not intended that the invention should be limited in this respect, however, for I may employ, if so desired, reactors of the type wherein the catalyst surrounds the tubes and the heating or cooling medium flows through the tubes. One reactor is at all times employed as a cracking zone while the catalyst in the other reactor is being regenerated by passing therethrough a stream of relatively inert gases (such as combustion gases, for example) containing controlled amounts of air or oxygen. The reactors are alternately operated with respect to the service for which they are employed by means of valves V1 and V2 through which the reactants and the regenerating gases are supplied and withdrawn, and by means of valves V3 and V4 through which intermediate conversion products employed as a heating and cooling medium are directed. Any suitable valve arrangement capable of switching the direction of flow of the stream of reactants and the stream of regenerating gases may be employed within the scope of the invention, and, for the sake of simplifying the description and illustrating the process without unnecessary complications, each of the switching valves is here illustrated as a single four-way valve in which the position of the two passageways therethrough may be shifted as illustrated in Figs. 2 and 3.

Assuming that valves V1, V3, and V4 are each adjusted to the position illustrated in Fig. 2, and valve V2 is adjusted to the position illustrated in Fig. 3, the hydrocarbon vapors in line 8 pass through valve V1 into line 10 and thence into reactor A where they are contacted with a suitable catalytic material contained therein. While the hydrocarbon vapors are in contact with the catalytic material, the endothermic heat of conversion is supplied to the vapors being converted in the manner to be described more fully later.

The preferred cracking catalysts for use in the present process consist in general of a precipitated alumina hydrogel and/or zirconia hydrogel composited with silica hydrogel, the gel composite being washed, dried, formed into particles, and calcined to produce a catalyst mass. The invention, however, is not limited to these particular catalysts, for other catalysts such as, for example, the hydrosilicates of alumina, acid treated clays, and the like, may be used within the broad scope of the invention.

In the following specification and claims the terms silica-alumina, silica-zirconia, and silica-alumina-zirconia masses are used in the broad sense to designate the synthetic composites referred to above. The preferred catalysts may be prepared by precipitating silica from a solution as a hydrogel within or upon which the alumina and/or zirconia is deposited also by precipitation as hydrogels. The silica hydrogel may be conveniently prepared by acidifying an aqueous solution of sodium silicate by the addition of a required amount of hydrochloric acid. After precipitating, the silica gel is preferably washed until substantially free from alkali metal salts. The washed silica hydrogel is then suspended in a solution of aluminum and/or zirconium salts and an alkaline precipitant, such as ammonium hydroxide, ammonium carbonate, or ammonium sulfide, is added to the solution to precipitate aluminum and/or zirconium hydrogels. The final precipitate, comprising essentially hydrated silica and hydrated alumina and/or zirconia, is washed to substantially completely remove water soluble materials, and dried at about 300° F. to produce a rather crumbly and granular material which may be ground and pelleted or sized to produce particles of catalyst, after which the catalyst particles are calcined at a temperature in the approximate range of 1000–1500° F. Various other procedures such as, for example, co-precipitation of the hydrated gels may be employed, when desired, to produce the preferred catalyst.

Cracking temperatures, preferably of the order of 600–1000° F. more or less, and pressures ranging, for example, from substantially atmospheric to 200 pounds or more per square inch superatmospheric may be employed when using a preferred catalyst, although the process is not limited to this range of conditions exactly.

While the hydrocarbon conversion reaction is being accomplished in reactor A the catalyst in reactor B may be subjected to regeneration treatment by contacting therewith a suitable inert gas, such as combustion gas, containing controlled amounts of air or oxygen. Fresh regenerating gases are introduced to the system through line 63, containing valve 64, by means of which they are conducted to valve V1 wherethrough they pass into line 10' and thence into reactor B.

The carbonaceous substances deposited upon the catalyst in the previous processing period are burned therefrom and the exothermic heat of regeneration is absorbed by the cooling oil introduced, as hereinafter described. Spent regenerating gases from reactor B are directed through line 11' to valve V2 wherethrough they pass into line 65, containing valve 66, after which the gases may be exhausted or, when desired, the sensible heat from the gases may be recovered in suitable equipment, not shown, and air or oxygen commingled with the resulting cooled gases and the mixture thereafter returned to reactor B as the fresh regenerating gases.

The conversion products from reactor A are directed through line 11 to valve V2 wherethrough they pass into line 12, containing valve 13, into fractionator 14. The vaporous conversion products supplied to fractionator 14 are fractionated therein to separate vapors boiling substantially in the gasoline range from the higher boiling intermediate conversion products and the latter are condensed in the fractionating zone.

The fractionated vapors separated in fractionator 14 are directed through line 15, containing valve 16, to the conventional condenser and receiver, not shown, wherein the normally gaseous products are substantially separated from the gasoline boiling range hydrocarbons. A portion of the gasoline boiling range hydrocarbons collected in the receiver may be returned to the upper portion of fractionator 14 by well-known means, not shown, as a refluxing and cooling medium, and the residual portion of the gasoline boiling range hydrocarbons removed from the receiver as a product of the process.

The heavy conversion products are withdrawn through line 17, a portion of which may, if desired, be withdrawn through valve 18 and subjected to any further treatment. The remainder of the heavy conversion products is conducted through line 19, containing valve 20, following which it is commingled with the heavy conversion products formed in the thermal cracking treatment described more fully later. The mixture of the heavy conversion products is conducted from line 19 through pump 21 and through line 22, containing valve 23, into heating coil 24 wherein the hydrocarbon oils are heated to the desired conversion temperatures which may range, for example, from 850-100° F. and are preferably maintained at this temperature within heating coil 24 for a sufficient period of time to effect substantial thermal cracking, heat being supplied from furnace 25. The products leaving heating coil 24 at a superatmospheric pressure ranging, for example, from 100-300 pounds or more per square inch, are directed through line 26, containing valve 27, and are subsequently commingled with the intermediate conversion products in line 41 obtained in a manner to be described more fully later.

The catalytic intermediate conversion products from fractionator 14 are directed through line 28, containing valve 29, pump 30, line 31, and valve 32, and are subsequently commingled with the residual portion of the thermal intermediate conversion products from line 59, which are formed in a manner to be described more fully later. The mixture of intermediate conversion products is introduced into heating coil 33, contained in furnace 34, wherein heat is supplied to raise the temperature of the mixture sufficiently high to initiate combustion of carbonaceous substances, particularly when the heated intermediate conversion products are brought in contact with the reaction zone in which the catalyst is undergoing regeneration. The heated intermediate conversion products leaving heating coil 33 are directed through line 34', containing valve 35, to valve V3 wherethrough they pass into line 36 and thence into reactor B wherein they are contacted with the exterior of the reaction zone, thereby absorbing heat produced in the regeneration reaction. The intermediate conversion products leaving reactor B, having a higher heat content than the entering material, are directed through line 37 to valve V4 wherethrough they pass into line 38 and thence through valve V3 into line 39 by means of which they are introduced to reactor A wherein they are contacted with the exterior of the reaction zone in which the reactants are undergoing conversion. A substantial portion of the heat contained in the intermediate conversion products is imparted to the reactants undergoing conversion in reactor A, thereby supplying heat of conversion thereto. The intermediate conversion products leaving reactor A are directed through line 40 to valve V4 wherethrough they pass into line 41, containing valve 42, and are subsequently commingled with the products from coil 24 introduced through line 26.

The resulting mixture is conducted through line 41 into reaction chamber 43 which is preferably maintained at substantially the same or at a slightly reduced pressure relative to that employed on the outlet of heating coil 24, and which is preferably insulated to reduce radiation losses therefrom, although no insulation appears in the drawing.

The resulting conversion products leaving reaction chamber 43 are conducted through line 44, containing valve 45, to a vaporizing and separating chamber 46 which is preferably operated at a reduced pressure relative to that employed on the outlet of reaction chamber 43 which may range, for example, from 50-200 pounds or more per square inch. The vaporous conversion products are separated from the liquid conversion products in chamber 46 and the latter, due to the reduction in pressure, are subjected to substantial further vaporization to form a non-vaporous liquid residue, which is removed from chamber 46 by way of line 47 and valve 48, cooled and recovered as a product of the process or subjected to any desired further treatment.

Vaporous conversion products, together with vapors evolved in chamber 46, are conducted through line 49 and valve 50 into fractionator 51 wherein they are fractionated to separate vaporous hydrocarbons boiling substantially in the gasoline range from the higher boiling oils.

The fractionator vapors are withdrawn through line 52, containing valve 53, into the conventional condenser and receiver system, not shown, wherein the gasoline boiling range hydrocarbons are condensed and are substantially separated from the normally gaseous hydrocarbons. A portion of the gasoline boiling range hydrocarbons collected in the receiver may be returned to the upper portion of fractionator 51 by well-known means, not shown, as a refluxing and cooling medium and the residual portion of the hydrocarbons removed from the receiver and recovered as a product of the process.

Fractionator 51, together with the condensing and collecting equipment connected therewith, is preferably operated at substantially the same or slightly reduced pressure relative to that employed in chamber 46, although pressures down to substantially atmospheric may be used.

The intermediate conversion products are withdrawn through line 54, valve 55, and pump 56, wherefrom they may be subsequently separated into two streams, not necessarily equal, one of which is conducted through line 57 containing valve 58 and commingled with the charging oil as previously described, while the other is directed through line 59, containing valve 60, and commingled with the intermediate catalytic conversion products in line 31, also as previously described. The heavy conversion products condensed in fractionator 51 are withdrawn through line 61, containing valve 62, and subsequently commingled in line 19 with a portion of the heavy conversion products formed in the catalytic cracking treatment previously described.

In the catalytic cracking operation, as described above, when the catalyst in reactor A approaches the state of reduced activity, at which time it is advantageous to apply freshly regenerated catalyst for the treatment of the vapors, the supply of air to the regenerating gas stream is momentarily discontinued so that reactor B is purged of oxygen-containing gases, and after the purging in reactor B is completed, valve V1 is switched to the position in Fig. 3 at which time oxygen-free gases are introduced to reactor A and hydrocarbon vapors to reactor B. After a lag corresponding to the time required to drive the vapors from reactor A and the oxygen-free gases from reactor B, valve V2 is switched to the position indicated in Fig. 2 at which time oxygen is again admitted to the regenerating gas stream.

Either prior to, simultaneously with, or subsequent to, the switching of valves V1 and V2, valves V3 and V4 may be switched to the position indicated in Fig. 3 in order that the proper heating and cooling may be effected in reactors A and B. After the switching of valves V1, V2, V3, and V4 the flow of hydrocarbon vapors in line 8 will be through valve V1 into line 10' and thence to reactor B, while the flow of conversion products from reactor B will be through line 11', valve V2, and line 12. The flow of the conversion products from this point on will be substantially as described. The flow of the fresh regenerating gases, on the other hand, will be through valve V1 into line 10 and thence into reactor A. The spent regenerating gases from reactor A will flow through line 11 to valve V2 and thence into line 65, containing valve 66. The flow of the intermediate conversion products in line 34, employed as a heating and cooling medium to the reaction zones, will be through valve V3 into line 39 and thence through reactor A. The intermediate conversion products leaving reactor A flow through line 40, valve V4, and line 38 to valve V3, into line 36, and thence into reactor B. The intermediate conversion products from reactor B are directed through line 37 and valve V4 into line 41, the flow thereafter being substantially as described.

Switching of the stream of hydrocarbon vapors and regenerating gases is periodically repeated by reversing the position of the switching valves so that the partially spent catalytic material in one reactor is being continuously regenerated, and the stream of hydrocarbon vapors is being continuously converted in the other reactor. The switching valves may be manually operated but, to simplify operation of the process and to avoid mistakes in the operation of the valves, all of the valves may preferably operate from a single time cycle controller of any well-known form in accordance with a definite predetermined schedule.

An example of one specific operation of the process is approximately as follows although the invention should not be interpreted as limited exactly in accordance therewith: Charging oil comprising a 32° A. P. I. gravity Mid-Continent gas oil, together with a portion of the intermediate conversion products from the thermal cracking treatment, formed as hereinafter described, was heated to a temperature of 930° F. and the resulting vapors subjected to contact with silica-alumina-zirconia catalyst in a reaction zone heated, as subsequently described. Simultaneously therewith, the catalyst contained in another reaction zone was regenerated by contacting therewith the heated regenerating gases containing approximately 2% by volume of oxygen while cooling this zone, as subsequently described. The hydrocarbon conversion products from the catalytic reaction zone were fractionated to separate gasoline boiling range hydrocarbons, intermediate conversion products, and heavy conversion products. The gasoline produced in this operation amounted to approximately 35% by volume of the fresh gas oil charged.

Heavy conversion products were collected and separated and commingled with the heavy conversion products from the thermal cracking treatment formed, as hereinafter described, and the resulting mixture subjected to thermal cracking treatment in a heating coil and communicating reaction chamber at a temperature of 920° F. and at a superatmospheric pressure of 200 pounds per square inch on the outlet of the reaction chamber. Intermediate conversion products after being used as the heat exchange medium in the catalytic cracking reactors as described later, were commingled with the conversion products leaving the heating coil of the thermal cracking treatment prior to their introduction to the reaction chamber, and were contained in the mixture of conversion products leaving the reaction chamber, as subsequently described.

The catalytic intermediate conversion products collected and separated, as previously described, were commingled with a portion of the intermediate conversion products from the thermal cracking treatment, and the mixture was heated to a temperature of 900° F. and contacted first with the exterior of the reaction zone in which the catalyst was undergoing regeneration to absorb a substantial portion of the heat produced in the regeneration reaction, after which said mixture was contacted with the exterior of the reaction zone in which the reactants were undergoing conversion to supply the endothermic heat of conversion, following which the mixture was commingled with the conversion products from the thermal cracking treatment prior to their introduction to the reaction chamber, as previously described. The mixture of conversion products leaving the reaction chamber was introduced to a vaporizing and separating chamber wherein the non-vaporous liquid residue corresponding to approximately 15% by volume of the fresh gas oil was removed and separated from the vaporous conversion products and the latter was supplied to a fractionating zone to separate gasoline boiling range hydrocarbons, intermediate conversion products, and heavy conversion products. The gasoline withdrawn amounted to approximately 35% by volume of the fresh charging oil. The intermediate conversion products separated and collected as previously described were separated into two streams, one of which was directed to the catalytic cracking treatment, the other of which was employed as part of the heat exchange medium in the catalytic cracking treatment, as previously described.

I claim as my invention:

1. A process for the conversion of a hydrocarbon oil into lower boiling products including gasoline which comprises maintaining a thermal cracking step and a catalytic cracking step, fractionating the reaction products from said steps in separate fractionating zones, recovering gasoline and gas, recycling high boiling conversion products from both steps to said thermal step, supplying a portion of intermediate boiling conversion products from said thermal step together with a hydrocarbon oil charge to said catalytic cracking step, passing a portion of said intermediate reaction products from said thermal cracking step, together with intermediate reaction products from said catalytic cracking step in indirect heat exchange relationship first with catalytic material in the catalytic conversion step undergoing regeneration and then with the catalytic material used for cracking hydrocarbons, and thereafter passing the mixture to the aforesaid thermal cracking step.

2. A process for converting a hydrocarbon oil into lower boiling products including gasoline which comprises maintaining a thermal conversion step and a catalytic conversion step, said catalytic conversion step comprising at least two catalytic zones through which streams of hydrocarbons and regenerating gases are alternately directed, at least one of said zones being used in cracking hydrocarbons with a resultant endothermic reaction while simultaneously the catalyst in other zones is undergoing regeneration by oxygen-containing gas with a resultant exothermic reaction, separately fractionating the reaction products from said thermal and said catalytic conversion steps to separate desired products, intermediate conversion products, and heavy conversion products, combining a portion of said intermediate conversion products from said thermal step with the hydrocarbon oil charged, supplying it to said catalytic step, passing the remaining intermediate conversion products from said thermal step together with the intermediate conversion products from said catalytic step in indirect heat exchange relationship with the catalyst in said catalytic reaction zone undergoing regeneration to absorb heat therefrom, subsequently passing the material in indirect heat exchange relationship with the catalyst in said catalytic reaction zone wherein hydrocarbons are undergoing conversion to supply heat thereto, and thereafter passing the material to said thermal conversion step and supplying at least a portion of the aforesaid heavy conversion products from said thermal and catalytic steps to said thermal step.

3. In a process for the conversion of a hydrocarbon oil to gasoline wherein a composite of higher boiling thermal and catalytically cracked reaction products is supplied to a thermal conversion zone and raw oil charging stock is supplied to a catalytic conversion zone, the reaction products from each of said zones being separately fractionated to separate gasoline, intermediate boiling oil, and higher boiling oil for further conversion in the process, the improvement which comprises passing said intermediate boiling oil from the catalytc zone together with a portion of the intermediate boiling oil from the thermal zone in indirect heat exchange relationship with the catalyst in said catalytic zone and thereafter supplying the reaction products to the aforesaid thermal conversion zone.

4. The process of claim 1 further characterized in that the insufficiently converted hydrocarbons from the catalytic cracking step are heated before utilizing them as heat exchange fluid to a temperature sufficient to maintain regeneration of the catalytic material.

5. A process for the conversion of a hydrocarbon oil into lower boiling products which comprises maintaining a thermal conversion step and a catalytic conversion step, the latter consisting of at least two catalytic conversion zones, at least one of which is used for the conversion of a hydrocarbon oil with a resultant endothermic reaction while other or others are undergoing regeneration by oxygen-containing gases to remove carbonaceous deposits formed on the catalyst with a resultant exothermic reaction, and alternately switching the flow of hydrocarbon oil and regenerating gases from one zone to the other zone; separately fractionating reaction products from each of said conversion steps to separate desired products, intermediate conversion products, and heavy conversion products, subjecting said intermediate conversion products formed in said thermal conversion step together with the fresh charge of hydrocarbon oil to treatment in said catalytic conversion step, subjecting said intermediate conversion products formed in said catalytic conversion step to indirect heat exchange with the catalyst in the catalytic conversion zone wherein the catalyst is undergoing regeneration to absorb heat produced therein, then passing them in indirect heat exchange with the catalyst in the catalytic conversion zone wherein hydrocarbon oil is undergoing conversion to supply heat thereto, and finally supplying them together with said heavy conversion products produced as herein before described to said thermal conversion step.

6. A process as described in claim 5 further characterized in that said intermediate conversion products from said catalytic conversion step are heated before subjecting them to indirect heat exchange with said catalytic conversion zone or zones wherein the catalyst is undergoing regeneration.

7. A process for the conversion of a hydrocarbon oil into lower boiling products which comprises maintaining a thermal conversion zone and a catalytic conversion zone, separately fractionating reaction products from each zone to separate desired products, intermediate conversion products, and heavy conversion products, subjecting said intermediate conversion products formed in said thermal conversion zone together with the fresh charge of hydrocarbon oil to treatment in said catalytic conversion zone, passing said intermediate conversion products formed in said catalytic conversion zone in indirect heat exchange relationship with the catalyst in the catalytic conversion zone and thereafter supplying them together with at least a portion of said heavy conversion products formed in each of said conversion zones to said thermal conversion zone for further treatment.

8. A conversion process which comprises thermally cracking relatively heavy hydrocarbon oil while subjecting lighter hydrocarbon oil to catalytic cracking in contact with a first catalyst bed, simultaneously subjecting a second catalyst bed, previously used in processing, to exothermic regeneration, fractionating the thermally cracked products to separate insufficiently converted hydrocarbons therefrom, passing at least a portion of said insufficiently converted hydrocarbons in indirect heat exchange relation with said second and first catalyst beds in the order named and subsequently returning the same to the thermal cracking operation, and supplying insufficiently converted products of the catalytic cracking to the thermal cracking.

WAYNE L. BENEDICT.